United States Patent Office 3,464,042
Patented Aug. 26, 1969

3,464,042
DEVICE FOR MEASURING PHYSICAL QUANTITY
Rune Raman, Stockholm-Vallingby, Sweden, assignor to Arenco Electronics AB, Stockholm-Vallingby, Sweden
Filed Dec. 4, 1967, Ser. No. 687,565
Claims priority, application Sweden, Dec. 9, 1966, 16,888/66
Int. Cl. H01f 21/02, 29/00, 17/04
U.S. Cl. 336—20                                    8 Claims

ABSTRACT OF THE DISCLOSURE

An arrangement for measuring physical quantities comprising a measuring body of magnetostrictive material, said body being influenced by mechanical forces depending on said quantities, through bores being disposed in said body, within said bores at least two windings being arranged, one of which constitutes an energizing winding and a second a measuring winding, the mutual inductance between said windings being dependent on the mechanical stresses produced by said forces, said bores presenting a cross section in the form of an ellipse or a super-ellipse, the transverse axes of said ellipses being arranged in parallel with the direction of said forces.

Means for measuring physical quantities

Figure 1:
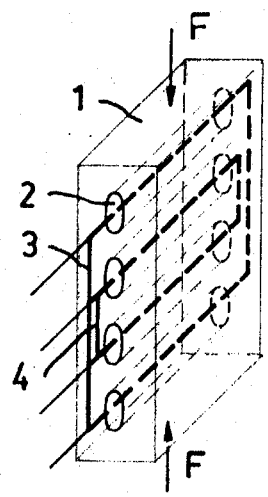

The present invention is concerned with an arrangement for measuring physical quantities, the arrangement comprising a measuring body made of magnetostrictive material and which is adapted to be subjected to mechanical forces dependent on said quantities, and in which are disposed bores extending through said measuring body, wherein at least two windings are arranged in the bores and of which the one winding is an energizing winding and the other a measuring winding and wherein the mutual inductance of the windings is dependent on the mechanical stresses which are produced by the force acting on the measuring body.

A magnetoelastic transmitter, which includes a measuring body of magnetostrictive material, is used for measuring, for instance compressive forces. The measuring body may be in the shape of a parallelepipidon. Two opposing faces of said body are arranged to be acted upon by the compressive forces to be determined. In measuring bodies possessing this shape the actuating forces become distributed approximately evenly across the cross-sectional area of the body. A number of through bores are disposed in the centre portion of the measuring body, the measuring zone, for receiving energizing and measuring windings, respectively.

As is commonly known, the mechanical stress at the edges of a bore, i.e. the stress in the zones of the bore, which are located normal to the direction, in which the force acts, in a uniformly loaded body, is considerably greater than in remaining portions of the body. The mechanical stresses at the edges of the bores, which house the windings, and thus in the measuring zone, are therefore much greater than in remaining portions of the measuring body, resulting in that these portions are utilized from a mechanical aspect to a much poorer extent. The ratio between the force acting on the measuring body and the electric voltage obtained from the measuring winding linearly only reaches to a specific magnitude of the mechanical stress in the measuring zone. This magnitude is normally lower than the mechanical stress, which can be permitted from the aspect of material strength. The measuring body is therefore not utilized to the fullest extent from the mechanical aspect. If it is desired to determine large forces and that a linear ratio between acting force and output electric voltage is also desired the measuring body must be given larger geometrical dimensions.

To enable the measuring body to be utilized to a greater extent without changing its dimensions extra bores or recesses are usually disposed within the measuring zone of the measuring body. In this way the stresses are distributed differently in the material and larger forces can be determined while retaining the linearity. In this connection the bores and the rounded portions of the recesses have always been circular in shape. However, it is desirable to achieve the same effect without it being necessary to arrange extra bores or recesses in the measuring body. The object of the present invention is therefore to provide bores which present a cross section of such configuration that the desired result is obtained. The invention is mainly characterized in that the bores housing the respective windings present a cross section having the shape of an ellipse whose transverse axis is positioned in a direction parallel to the direction in which the load acts. In this way the stresses are so distributed in the measuring body that it is possible to measure larger forces than in the case of circular bores. The conjugate axis of the ellipse is equal in size to the diameter of the circular bore. An even more favourable distribution is obtained if the cross section of the bore is in the form of a super-ellipse, whereby the mechanical stresses can be further increased.

Figure 2:
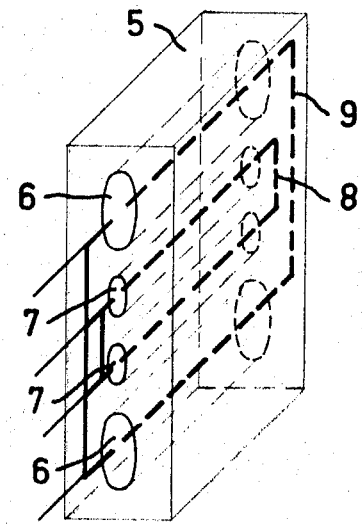
Figure 3A:
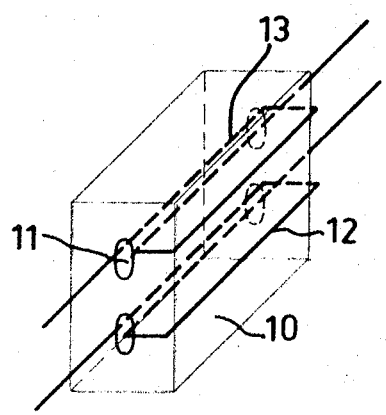
Figure 3B:
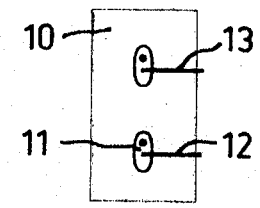

The invention will now be described with reference to accompanying drawing, wherein FIG. 1 shows a measuring body wherein all the bores disposed therein are of the same size, FIG. 2 shows a measuring body presenting pairs of bores, wherein respective pairs are of different size and FIGS. 3a and 3b show a measuring body presenting only one bore for each winding.

FIG. 1 shows in perspective an embodiment of a measuring body which has the shape of a parallelepipidon and which is adapted to be acted upon by a force F, on two opposing side faces. Through bores 2 are disposed parallel to one another in the longitudinal direction of the body and perpendicular to the direction in which the forces applied. A energizing winding 3 is arranged in two of said bores and a measuring winding 4 is placed in the remaining two bores. The cross section of all bores has the shape of an ellipse or a super-ellipse. All bores in the measuring body are the same size and their transverse axes lie in the same plane. The transverse axes are positioned in a direction parallel with the direction in which the force is applied. The conjugate axes of the bores are equal in size to the diameter of the circular bore, which the elliptical bore replaces.

FIG. 2 shows, in perspective, another embodiment in which two of the bores deviate in size from the remaining bores. The measuring body also has the shape of a parallelepipedon; the force being arranged to act upon side faces 5 of said body. Bores 6 and 7 are disposed parallel to said side faces in the longitudinal direction thereof, the cross section of the bore 6 being considerably larger than the cross section of the bore 7. Positioned in bore 6 is a energizing winding 9 and positioned in bore 7 is a measuring winding 8. The cross sections of all the bores have the shape of an ellipse or super-ellipse, the transverse axis of which being arranged in a direction parallel with the direction in which the force acts.

A further embodiment is shown in FIG. 3, wherein FIG. 3a shows the measuring body in perspective and FIG. 3b shows the measuring body seen from one side face thereof. The body is still in the shape of a parallelepipedon 10, in which only two parallel bores 11 are disposed. In the one of the bores is positioned a energizing winding 12 and in the other a measuring winding 13. The windings 12 and 13 are so arranged that a portion of the winding is positioned in the bore and the remaining portion of the winding encloses a portion of the outer walls of the measuring body. Both bores present a cross section in the form of an ellipse or a super-ellipse wherein, as in preceding embodiments, the transverse axis is positioned in a direction parallel to the direction in which the force acts.

In the shown embodiments the cross section of the bores is in the form of an ellipse or super-ellipse. Bores which present a cross section in the form of an ellipse promote such a change in the distribution of stresses in the measuring zone of the measuring body that the mechanical stress at the edges of the bores is reduced by about 30% when compared with circular bores whose diameters are equal to the size of the conjugate axis of the ellipse. Because of the favourable distribution of stresses in the material a higher value is obtained for the so called "form factor" i.e. the ratio between the widths (= the length of the conjugate axis) of the elliptical bore and the width of the measuring body in a direction normal to the direction of the bore and the direction in which the forces applied. As a result of the increased value of the form factor the said width of the measuring body can be decreased.

If the cross section is, instead, in the shape of a super ellipse, wherein the conjugate axis in cross section is equal to the diameter of the circular bore, it means that the length of the transverse axis can be decreased whilst retaining an unchanged length of the conjugate axis, owing to the fact that the super-ellipse affords a still more favourable distribution of stresses at the edges of the bore. This means that the extension of the measuring body in the direction in which the force is applied can be reduced while still retaining the favourable stress distribution in the measuring zone. The term "super-ellipse" is meant to define a curve whose equation is analogous with that of the ellipse but with the difference that the exponential in the equation of the super-ellipse is 2.1–3.0, preferably 2.75, instead of 2.0 in the equation of the ellipse. In the case of a super-ellipse a larger curvature radius on the curve at the ends of the transverse axis is obtained in comparison with an ordinary ellipse having axes of the same size.

By making the axes of the one pair of bores longer than the axes of the other pair of bores, according to FIG. 2, the stress distribution can be made still more favourable so that larger forces can be measured. The embodiment shown in FIG. 3 is the result of an attempt to keep the extension of the measuring body in the force direction as small as possible. Only two bores are disposed in this embodiment, the transverse axes of the bores being positioned in the direction of the applied force. With the cross sections of the said bores shaped as a super-ellipse the extension of the measuring body in the direction of the transverse axes is thus reduced to a minimum.

Because of the described shapes of the bores in the measuring body, in which bores the energizing and measuring windings are positioned, the mechanical stresses in the measuring zone of the body are so distributed that the said body can be used for measuring greater forces than would have been the case if the bores presented circular cross section. It should be observed in this connection that this result is obtained without the provision of extra bores, recesses or the like in the measuring zone, and without it being necessary to increase the geometrical dimensions of the measuring body.

What is claimed is:
1. An arrangement for measuring physical quantities, said arrangement comprising a measuring body of magnetostrictive material, said body being adapted to be influenced by mechanical forces depending on the magnitude of said quantities, in said body bores extending through the measuring body being disposed, within said bores at least two windings being arranged, one of said windings constituting an energizing winding and a second of said windings a measuring winding, the mutual inductance between said windings being dependent on the mechanical stresses produced by said forces, said bores in which respective winding being positioned presenting a cross section in the form of an ellipse, the transverse axis of said ellipse being arranged in parallel with the direction of said forces acting on said measuring body.

2. An arrangement according to claim 1 wherein the size of said transverse axes respective conjugate axes in said ellipse being the same for all bores.

3. An arrangement according to claim 1 wherein said bores being arranged in pairs, the transverse axes and conjugate axes in one of said pair of bores being larger than respective axes in remaining pairs of bores.

4. An arrangement according to claim 1 wherein only one of said bores being positioned for housing respective windings, a portion of said winding being positioned within said bore and the remainder of said winding enclosing a portion of the outer walls of said measuring body.

5. An arrangement for measuring physical quantities, said arrangement comprising a measuring body of magnetostrictive material, said body being adapted to be influenced by mechanical forces depending on the magnitude of said quantities, in said body bores extending through the measuring body being disposed, within said bores at least two windings being arranged, one of said windings constituting an energizing winding and a second of said windings a measuring winding, the mutual inductance between said windings, being dependent on the mechanical stresses produced by said forces, said bores in which respective winding being positioned presenting a cross section in the form of an super-ellipse, the transverse axis of said super-ellipse being arranged in parallel with the direction of said forces acting on said measuring body.

6. An arrangement according to claim 5 wherein the size of said transverse axes respective conjugate axes in said ellipse being the same for all bores.

7. An arrangement according to claim 5 wherein said bores being arranged in pairs, the transverse axes and conjugate axes in one of said pair of bores being larger than respective axes in remaining pairs of bores.

8. An arrangement according to claim 5 wherein only one of said bores being positioned for housing respective windings, a portion of said winding being positioned within said bore and the remainder of said winding enclosing a portion of the outer walls of said measuring body.

References Cited
UNITED STATES PATENTS

| | | | |
|---|---|---|---|
| 2,947,889 | 8/1960 | Rich | 310—26 |
| 3,093,999 | 6/1963 | Dahle et al. | 310—26 XR |
| 3,356,977 | 12/1967 | Ohlsson | 310—26 XR |

LEWIS H. MYERS, Primary Examiner

T. J. KOZMA, Assistant Examiner

U.S. Cl. X.R.

310—26; 335—215; 336—221